United States Patent Office 3,051,679
Patented Aug. 28, 1962

3,051,679
POLYESTER RESINS
George E. Forsyth, Trevose, Pa., assignor to Rohm & Haas Company, Philadelphia, Pa., a corporation of Delaware
No Drawing. Filed Dec. 12, 1960, Ser. No. 75,137
7 Claims. (Cl. 260—40)

This invention concerns a method for improving the preparation of fiber-reinforced plastic objects. According to this method (1) a mat is formed, (2) there are mixed (a) a solution comprising an unsaturated polyester dissolved in a polymerizable monomer having a vinylidene group with (b) a second solution comprising an unsaturated polyester dissolved in a polymerizable monomer having a vinylidene group, one of said solutions having dissolved therein a small proportion of isotactic poly-(methyl methacrylate) and the other solution having dissolved therein a small proportion of syndiotactic poly-(methyl methacrylate), at least one of said solutions containing a polymerization initiator, (3) the resulting mixture is passed in a fluid state into said mat, and (4) the mixture in the mat is allowed to gel and is then polymerized. Initial polymerization is effected below the melting point of the gel.

Thermoset objects have been prepared from solutions of unsaturated polyesters in vinylidene compounds which are reinforced with fibers. The fibers may be in the form of woven or non-woven mats or shapes, including "preforms." It is customary to impregnate or coat the fibrous material with liquid resin solution which contains polymerization initiator and sometimes an activator. If the temperature is kept low, solution tends to become rather viscous with loss of rapid wetting-out of fibers, commonly resulting in defects, and, if heat is applied, the viscosity of the solution decreases and permits liquid to flow from spaces in the mat or shape, resulting in "starved spots" and unevenness in the finished object. Even when efficient activators and promotors are used to decrease the time for the resin solution to set up or decrease the "gel time," uneven effects are often encountered, especially in shapes or areas having vertical components.

It has been proposed in order to alleviate some of the difficulties to render the resin solution somewhat thixotropic, as by addition of a silica aerogel. Such an expedient can only be used where opacity is not objectionable. It has proved difficult to incorporate such materials and to maintain uniformity. There is a tendency for them to settle and, again, there is difficulty in ensuring uniformity even after stirring.

By the process of the present invention it becomes possible to prepare fluid solutions which can be mixed with the resulting mixture remaining in a fluid state for a sufficient time to permit application to or absorption in fibrous mats or shapes, including "sheets" or "preforms." Thereupon, the mixture forms a physical gel which holds the mixture on or among the fibers of the sheet, mat, or shape. Then, when the mixture is polymerized, there results a more uniform, more reproducible product than ordinarily provided heretofore without special precautions.

Polyesters which may be used in this invention and solutions of polyesters in one or more polymerizable monovinylidene compounds are known. The polyesters are prepared by reaction of an α,β unsaturated dicarboxylic acid and a dihydric alcohol. There may also be used in the condensation reaction other types of dicarboxylic acids or tricarboxylic acids free of ethylenic or acetylenic unsaturation. Furthermore, there may be used monobasic acids or monohydric alcohols, which provide terminal groups for polymeric chains.

Useful dihydric alcohols include ethylene glycol, diethylene glycol, triethylene glycol, and other ethylene glycols, 1,2-propylene glycol, 1,3-trimethylene glycol, dipropylene glycol, butylene glycols, 2-methyl-2-propyl-1,3-propanediol, and mixtures of dihydric alcohols. Alcohols are generally used in about stoichiometric proportions with an excess of 5% up to 25% being often taken at the start, since glycols tend to be removed during formation of the polyester.

Examples of α,β unsaturated dicarboxylic acids and their anhydrides which may be used include maleic, fumaric, mesaconic, citraconic, chloromaleic, itaconic, aconitic, and carbic acids. It is often desirable to react the anhydride rather than the free acid.

The condensates of dihydric alcohol and α,β-unsaturated carboxylic acids may be modified with such polycarboxylic acids as phthalic, terephthalic, tetrachlorophthalic, succinic, methylsuccinic, dimethylsuccinic, adipic, suberic, azelaic, sebacic, and brassilic acids. Again, where practical, the anhydride may be used in place of the free acid. Acids of this type ordinarily constitute less than half of the total acidic portions.

When monofunctional terminal groups are desired, there may be used an acid such as acetic, propionic, 2-ethylhexoic, lauric, undecylenic, oleic, linolenic, linoleic, or eleostearic. Typical monohydric alcohols for termination include methyl, ethyl, propyl, butyl, octyl, lauryl, allyl, crotyl, oleyl, benzyl, phenoxyethyl, methoxyethyl, butoxyethoxyethyl, and cyclohexyl.

The preparation of polyesters from these starting materials is well known. The proportions of the various components are taken to provide the type of condensate which is desired. Reaction is continued until an acid number, usually below 50, is reached.

While the polyesters themselves are capable of forming crosslinked polymers when treated with a peroxidic initiator, it is more usual to dissolve one or more polyesters in a polymerizable vinylidene compound, preferably a monovinylidene, such as styrene, p-methylstyrene, methyl methacrylate, methyl acrylate, and other alkyl, cycloalkyl, aralkyl, and aryl acrylate and methacrylate, vinyl acetate, and allyl acetate. Typical polyvinylidene compounds which may be used as solvents for the polyesters include divinylbenzene, diallyl phthalate, diallyl succinate, diallyl adipate, allyl glycolyl allyl succinate, diallyl fumarate, and triallyl phosphate, and mixtures of these or mixtures with one or more monovinylidene compounds.

The polyesters and their solutions in polymerizable vinylidene compounds are generally inhibited with such a substance as hydroquinone, β-naphthol, phenylenediamine, resorcinol, catechol, alkylated catechols, etc.

As is known, polymerization is usually effected with a peroxidic catalyst such as benzoyl peroxide, acetyl peroxide, lauroyl peroxide, butyl perbenzoate, tert-butyl hydroperoxide, cumene hydroperoxide, or methyl ethyl ketone peroxide or mixtures of peroxidic initiators. The peroxidic initiator may be rendered effective at a relatively low temperature by the conjoint use of an activator such as an amine, polyamine, or a cobalt soap. It is generally desirable to dissolve the peroxidic initiator in part of the polyester and the activator in another part and bring these two parts together when it is wished to effect polymerization. Even more responsive systems may be developed by the use of a promoter in addition to an activator. Polymerization is started at a temperature below the melting point of the gel which forms when the isotactic and the syndiotactic polymers are brought together.

It is sometimes desirable to thicken the solution of polyester in monomeric vinylidene by the presence of a preformed soluble polymer or copolymer, such as a polymer of methyl methacrylate, ethyl methacrylate, or copolymers thereof, methyl or ethyl acrylate or copolymers thereof, these polymers being the conventional atactic forms. In addition to one or more such soluble polymers, there is dissolved isotactic poly(methyl methacrylate) in one portion of the polyester solution and syndiotactic poly(methyl methacrylate) in another portion.

Crystalline and crystallizable poly(methyl methacrylate)s have been described in the literature. Fox et al., J. Amer. Chem. Soc., 80, 1768 (1958), described the preparation of and characterized poly(methyl methacrylate) of type I, type II, and type III. Type I crystallizable polymer results from free radical polymerizations at low temperatures. Type II poly(methyl methacrylate) results by anionic polymerization in hydrocarbons, as with 9-fluorenyllithium at −60° C. in toluene. A magnesium, calcium, strontium, or barium polymerization initiator may also be used in a substantially non-solvating medium to initiate polymerization of methyl methacrylate to give type II polymer. As prepared, these various types of polymers are crystallizable rather than crystalline, but are readily rendered crystalline by treatment with crystallizing solvents, that is, solvents which are at best mediocre solvents for poly(methyl methacrylate), such as 4-heptanone. But for purposes of this invention, such solvent treatment is not required. All that is necessary is that the polymers having chains of predominantly isotactic or significantly syndiotactic arrangements be formed and used.

The types of crystallizable poly(methyl methacrylates) were further described by Stroupe and Hughes, J. Amer. Chem. Soc., 80, 2371 (1958), who established that type I polymer is syndiotactic and type II polymer is isotactic.

Identification and properties of the several types were further dealt with by Fox et al., J. Polymer Science 31, 173 (October 1958), where variations in infrared spectra were shown as useful for identifying the types of polymers, even as first formed. Identification has been confirmed by other polymer chemists. For example, Miller et al., Chemistry and Industry 41, 1323 (1958) confirmed the X-ray evidence and pointed out the differences in infrared spectra for the several types even before they had been crystallized. They had called the polymer of isotactic structure an α-polymer, and they relate this to type II of Fox et al. and relate their β-polymer to type I.

Additional information on these spectroscopic differences has been published by Baumann et al., Die makromolekulare Chemie, 36, 81 (1959). Such spectroscopic data are important because they are given by polymers which have not been treated with crystallizing solvent and which give in that state amorphous patterns in X-ray diagrams. For purposes of this invention, it is merely necessary to use polymer of the correct type as shown by infrared spectra, for example, and the polymers need not be actually crystallized from crystallizing solvent, although such crystalline polymer can also be used.

The several types of crystallizable and crystalline poly(methyl methacrylate) have been further confirmed by Korotkov et al., Zysokomoleculyarnye Soedineniya 1, No. 9, 1319 (1959), who also identify types in the same way as Fox et al. Thus, polymer chemists have accepted identification of type I polymers as syndiotactic and type II polymers as isotactic.

In the work done with the various forms of poly(methyl methacrylate) it has been demonstrated that the usual polymers of commerce which are prepared by free radical polymerization appear amorphous by X-ray examination and crystallinity as established by X-ray evidence is not developed even upon treatment with crystallizing solvents. Yet, other properties, particularly infrared absorption, show that a significant proportion of the chains of usual free radically obtained polymers is in syndiotactic arrangement provided polymerization has been conducted below 100° C. If polymerization is effected at higher temperatures, however, poly(methyl methacrylate) appears truly atactic.

In the polymers obtained by free-radical initiation below 100° C. there are regions of infrared absorption which show the presence of synidiotacticity, as at 9.4 microns. There are other regions of absorption which are also due to syndiotactic sequences.

When the non-crystallizable free-radically prepared poly(methyl methacrylate) shows the intermediate infrared absorption peak at 9.4 microns, it has been found to react in the same way as poly(methyl methacrylate) which is distinctly of type I structure (syndiotactic) for purposes of this invention. It has been found that in such polymers that are enough syndiotactic sequences to give the desired co-action with isotactic polymer.

For a polymer of methyl methacrylate to be recognizable as syndiotactic or isotactic, it is not required that every mer be in the prescribed geometric relation to its neighboring mers. It is necessary merely that there be long enough chains of the proper orderly arrangement and/or there be a significant or preponderant proportion of chains having the proper geometric relations of mers needed for the particular type. There can thus be a difference in quality or extent of tacticity in either type of polymer. For purposes of this invention it is only necessary that the respective types of poly(methyl methacrylate) give defining infrared absorption and that the type II polymer be either crystallizable from solvent or crystalline as shown by X-ray analysis.

For purposes of this invention it is necessary first that polymer having isotactic structure be used (type II), whether crystallizable or crystalline, provided the molecular weight is at least 1,000, and preferably 10,000 to 4,000,000, although polymers of molecular weights up to 8–10,000,000 or more are effective and useful.

Polymer corresponding to type I is also used or is developed in the process of this invention. It should have a molecular weight of at least 10,000 and preferably from 50,000 to 4,000,000, although, again, molecular weights up to 10,000,000 or more can be used. There is no sharp upper limit for molecular weights of either type I or type II polymers.

About 0.5% to 15% of isotactic poly(methyl methacrylate) is dissolved in one portion of the polyester-vinylidene monomer solution, the percentage being based, however, on total polyester solution to be polymerized. Usually an amount of 1% to 10% of isotactic polymer is preferred. When the tacticity is well developed, relatively less poly(methyl methacrylate) may be used than when the tacticity is less well developed. In general the proportion of syndiotactic polymer dissolved in another portion of the polyester-vinylidene monomer solution will have also the above limits, but the amounts of the two types of polymer used need not be the same.

Fibers or filaments of glass have for some time been used to reinforce polyester resins. The fibers may be used in the form of roving or of continuous fiber mats or non-woven fabric or of woven fabrics. Fibers are also used in the form of chopped-up roving or mats or spun fiberglass. These may be applied to a mold or shape to provide a fitted layer or "preform" which is then impregnated with resin. Also, if desired, spun fibers may be placed on a mold or form by an air stream, and separate solutions of isotactic and of syndiotactic poly(methyl methacrylate)s in polyester may be applied thereto or injected thereinto.

In one or both of the solutions there may be used release agent such as a fatty acid, long-chained alcohol, or lecithin, light stabilizer, such as salol, colorant, including dyes and pigments, and filler, or other additives, including wax, which helps provide a tack-free surface.

Additional details of the process of this invention are presented in the following examples, which are illustrative and not limiting. Parts are by weight unless otherwise designated.

*Example 1*

(A) A polyester is prepared in the conventional way by heating an equimolar mixture of maleic anhydride and o-phthalic anhydride with propylene glycol in 5% stoichiometric excess over these anhydrides at temperatures of 180° to 190° C. until an acid number of less than 50 is obtained. A blend is prepared from 50 parts of this polyester and 48 parts of methyl methacrylate.

(B) A second blend is prepared by mixing 50 parts of the above polyester with 44 parts of styrene.

(C) Poly(methyl methacrylate) having isotactic sequences is prepared by dissolving 50 parts of methyl methacrylate in 200 parts of anhydrous toluene. This mixture is treated under an inert atmosphere with 10 parts of phenylmagnesium bromide solution at 25° C. Polymer forms and is precipitated by adding methanol. The polymer is washed with methanolic hydrochloric acid and again with methanol and then dried. The polymer has an infrared absorption spectrum corresponding to that of the isotactic form and after treatment with 4-heptanone, it gives a crystalline polymer which by X-ray analysis is clearly of type II structure. It has a molecular weight (viscosity average) of about 100,000.

A solution is prepared from 2 parts of this isotactic poly(methyl methacrylate) in 98 parts of the blend from (A) above.

(D) Poly(methyl methacrylate) having syndiotactic sequences is prepared by free radical polymerization of methyl methacrylate at −50° C. in toluene solution containing benzoin, the mixture being subjected to ultraviolet light for 15 hours and the polymer being precipitated by addition of methanol. The polymer thus obtained has a molecular weight (viscosity average) of about 60,000.

In 94 parts of the blend prepared in (B) above there is dissolved 6 parts of this syndiotactic poly(methyl methacrylate).

(E) On plate glass sheet edged with spacers and coated with polyvinyl alcohol there is stretched a non-woven fabric of a 10 mil. surfacing veil.

To the solution prepared in (C) there is added 1% of methyl ethyl ketone peroxide. To the solution prepared in (D) there is added 0.5% of a cobalt naphthenate solution containing 6% cobalt (as metal). These two solutions are mixed together and immediately applied to the non-woven fabric until it is completely penetrated and covered. Within one minute thereafter a soft gel forms. Thereupon a second sheet of glass, also coated with polyvinyl alcohol, is drawn over the spacers to form a mold, which is then supported in a vertical position. In about 30 minutes the mixture has set to a firm gel and in about two hours the sheet is rigid. The glass-reinforced sheet is uniform and smooth and has excellent strength.

*Example 2*

(A) An isotactic poly(methyl methacrylate) is prepared in toluene with a Grignard reagent. It gives the typical infrared absorption spectrum of the isotactic form and a portion treated with 4-heptanone and freed of solvent at low temperature gives the X-ray diffraction pattern of isotactic poly(methyl methacrylate). It has a molecular weight (viscosity average) of about 250,000.

There is prepared a mixture of two parts of this polymer, 50 parts of a polyester of the composition described in Example 1A, 24 parts of methyl methacrylate, and 24 parts of styrene.

(B) Methyl methacrylate is polymerized at −70° C. in liquid ammonia with sodium amide as initiator. It is washed with methanolic hydrochloric acid and methanol and dried. It gives the typical infrared absorption spectrum of syndiotactic poly(methyl methacrylate) and a sample treated with 4-heptanone gives the X-ray diffraction pattern of crystalline syndiotactic poly(methyl methacrylate). It has a molecular weight (viscosity average) of about 150,000.

A blend is prepared from four parts of the above polymer and 96 parts of a mixture formed from 50 parts of the above polyester and 46 parts of styrene.

(C) A "preform" is prepared from 3-ounce glass fiber mat within a bowl-shaped mold. To solution (A) there is added 2 parts of benzoyl peroxide and to solution (B) there is added one part of N,N-diethylaniline. The two solutions are flowed together and sprayed onto the preform mat while the mold is rotated. The resulting mixture rapidly penetrates the mat and the mixture is supplied to form a uniform layer in the mold. Since the mixture forms a physical gel soon after the mixture is applied, uniformity over the entire mat is readily obtained, even though walls of mold are rotated to a vertical position and about an hour elapses before the polyester begins to set up from cross-linking and polymerization of the monomers. After about six hours the resin is cured and the article is removed from the mold. It is rigid and strong. The outer surface has a polished appearance while the inner surface is matte but regular. Irregularities which commonly occur in usual castings of this sort are absent.

*Example 3*

(A) A polyester is prepared from a mixture of maleic anhydride, p-phthalic anhydride, and propylene glycol by heating the mixture at about 10° C. until the acid number is less than 50. The glycol is used in 3% excess over an equivalent amount and the maleic anhydride constitutes 18% of the mixture.

A blend of 45 parts of this polyester is made with 51 parts of styrene. There is dissolved in this blend four parts of a poly(methyl methacrylate) of isotactic character.

This isotactic polymer was prepared by mixing 50 parts of methyl methacrylate with 750 parts of anhydrous toluene and adding thereto at −40° C. a solution of 1.3 parts of 9-fluorenyl-lithium in 30 parts of benzene. The polymer was precipitated with methanol, washed with methanol containing hydrogen chloride, and washed with methanol. Infrared analysis demonstrated that the polymer was isotactic. After a portion of the polymer was heated with 4-heptanone, the X-ray diffraction pattern of isotactic poly(methyl methacrylate) was obtained. Molecular weight was determined from viscosity measurements as about 170,000.

(B) To a blend of 50 parts of the above polyester and 47 parts of styrene there is added three parts of syndiotactic poly(methyl methacrylate) like that used in Example 2.

(C) To the mixture prepared in (A) with isotactic polymer there is added 0.25% of dimethylaniline. To the mixture with syndiotactic polymer prepared in (B) there is added 2% of benzoyl peroxide.

These two compositions are then flowed together in equal proportions and sprayed onto a 1½ ounce No. 216 B glass mat held in a vertical position. After about three minutes the mat is thoroughly penetrated and saturated with the polyester mixture. During this time this mixture forms a thick non-flowing gel which prevents the mixture from running off or sagging. Within about 40 minutes polymerization of the mixture gives a firm sheet and in about three hours the sheet is rigid and strong. It is desirably uniform and even.

*Example 4*

Solutions as prepared in Example 3(C) are prepared and applied to the glass mat in a similar way. A physical gel forms as soon as the mat becomes filled with the solutions. The assembly is then heated in an oven at 50° C. Within 10 minutes polymerization is taking place and within a half hour substantial polymerization has occurred, whereupon the sheet is heated up to 80° C. The sheet is then cooled. It is strong and rigid. Even with the increases in temperature the sheet remains uniform.

*Example 5*

(A) A polyester is prepared as described in Example 3(A). There are mixed 45 parts of this polyester and 50 parts of vinyl-toluene. In this mixture there is dissolved 5 parts of isotactic poly(methyl methacrylate) of a viscosity average molecular weight of 120,000. This polymer was prepared by dissolving 50 parts of methyl methacrylate in 200 parts of anhydrous toluene and treating this solution with 10 parts of a phenylmagnesium bromide solution at 0° C., the resulting polymer being precipitated with petroleum ether.

(B) A solution of 3 parts of syndiotactic poly(methyl methacrylate) in a polyester-styrene mixture prepared as in Example 3 is prepared.

(C) A mold is prepared as in Example 1 but with a sheet of woven glass fiber cloth (Volan 181). To the solution from (A) is added two parts of methyl ethyl ketone peroxide and to the solution from (B) is added one part of cobalt octoate. The two solutions are brought together and sprayed into and over the cloth. Within a minute thereafter the mixed solutions form a gel.

There is placed over the gel a layer of 1½ ounce mat of glass fibers and the two catalyzed solutions are intermingled and applied to this mat. Again, a physical gel quickly forms. Within 30 minutes the laminated structure polymerizes to a firm gel which is then heated to 50° C. for an hour to yield a strong, rigid laminate of good uniformity.

*Example 6*

(A) A polyester prepared as in Example 3(A) (43 parts) is mixed with styrene (47 parts) and 10 parts of an isotactic poly(methyl methacrylate) of a molecular weight of about 25,000 dissolved therein. Thereto is added one part of dimethylaniline.

(B) A polyester prepared as in Example 1(A) (50 parts) is mixed with 48 parts of methyl methacrylate and 2 parts of a syndiotactic poly(methyl methacrylate) of a viscosity average molecular weight of about 300,000. Thereto is added two and a half parts of benzoyl peroxide.

(C) A glass fiber mat is held in a vertical position and sprayed with the above solutions, mixing occurring as the two solutions are mixed from the spray guns and as they penetrate the mat. The solutions rapidly gel in and on the mat to form a sheet. The sheet sets soon from polymerization and becomes strong and rigid in several hours.

Mat sprayed in the same way with solutions from the same polyester and same monomers in the above proportions but without the two types of poly(methyl methacrylate) fail to hold the mixed solutions, resulting in thin spots and marked unevenness.

Replacement of the above two types of poly(methyl methacrylate) with an equal weight of amorphous poly(methyl methacrylate) gives solutions, which, when mixed, tend to sag and run in the mat with resulting lack of uniformity.

*Example 7*

Respective solutions of polyester and monomers are prepared as in Example 1. To one solution is added 0.25 part of dimethylaniline and to the other one part of benzoyl peroxide and one part of tert-butyl perbenzoate. The two solutions are commingled as they are applied to a glass fiber preform in a shaped mold. Within one to two minutes the mixed solutions form a gel so that whether the preform is in a horizontal, vertical, or overhead position, the polyester solutions are retained in the mat without sagging or running. In about 20 minutes polymerization has made the resin semi-rigid, and the shaped object is warmed to 90° C. progressively to hasten the cure within 30 minutes.

In operations of this sort heating can be initiated after the initial gel is formed from the two types of poly(methyl methacrylate). Temperatures of the formed object can be carried at an early stage up to the melting point of this kind of gel and as polymerization proceeds temperatures can be further advanced to accelerate the curing of the polyester solutions. In this way increased output is obtained.

This method can be applied to shapes and forms having vertical components or overhead parts without causing marked unevenness such as runs, sags, or starved spots. The method further permits use of a relatively larger proportion of monomer with lower costs and rapid wetting out of fibers and penetration of fabrics. Since it now becomes possible to use less viscous solutions not only is more rapid wetting out obtained, but good wetting out and good penetration can be secured at relatively low temperatures with the further advantage that the initial or physical gel sets up more rapidly and even more firmly with consequent advantages.

Furthermore, the method permits speeding up the polymerization through heating. Polymerization may be initiated at temperatures up to the melting point of the physical gel which forms after solutions of the two types of poly(methyl methacrylate) are mixed. The melting points of these gels are in the range of about 60° to about 70° C., the exact melting point varying slightly with amounts and proportions of the two types of poly(methyl methacrylate), the degree of purity of each type, and the particular polyester solutions. As soon as polymerization has been carried to the extent where the mixture is chemically gelled through cross-linking, temperatures can be carried, if desired, to 125°–150° C. to complete polymerization more rapidly and completely.

While the examples have been directed primarily to use of glass fibers, other fibers may be used in place thereof or in addition thereto. For instance, overlays may be used in the form of woven or non-woven fabrics from cellulose, polyester, polyamide, or other natural or synthetic fibers or such fibers as may be used in place of glass fibers.

I claim:

1. A process for preparing fiber-reinforced plastic objects, which comprises forming a mat of fibers, mixing a first solution of a polyester having units from a dihydric alcohol and from an $\alpha,\beta$-ethylenically unsaturated dicarboxylic acid in polymerizable monomer having a vinylidene group, $CH_2=C<$, and a second solution containing polymerizable polyester having units from a dihydric alcohol and from an $\alpha,\beta$-unsaturated dicarboxylic acid in a monomer having a vinylidene group, one of said solutions having dissolved therein a small proportion of isotactic poly(methyl methacrylate) and the other solution having dissolved therein a small proportion of syndiotactic poly(methyl methacrylate), at least one of said solutions containing a polymerization initiator, applying the resultant mixture, while still fluid, to said mat, whereupon said mixture forms a gel, and initiating polymerization of said mixture at a temperature below the melting point of said gel.

2. A process for preparing fiber-reinforced sheets, which comprises forming a layer of fibers, mixing a first solution of a polyester having units from a dihydric alcohol and from an $\alpha,\beta$-ethylenically unsaturated dicarboxylic acid in polymerizable monomer having a vinylidene group, $CH_2=C<$, and a second solution of a polyester having units from a dihydric alcohol and from an $\alpha,\beta$-ethylenically unsaturated dicarboxylic acid in polymerizable monomer having a vinylidene group, one of said solutions having dissolved therein a minor proportion of isotactic poly(methyl methacrylate) and the other solution having dissolved therein syndiotactic poly(methyl methacrylate), one of said solutions containing a polymerization initiator and the other an activator for said initiator, applying the resultant mixture, while still fluid, to said layer of fibers, whereupon the mixture forms a gel, and initiating polymerization of said mixture below the melting point of the gel.

3. A process for preparing fiber-reinforced plastic products which comprises (1) forming a shaped mass of fibers, (2) preparing a first solution in a polymerizable monomer having a vinylidene group, $CH_2=C<$, of a polyester having α,β-ethylenically unsaturated dicarboxylic acid units and dihydric alcohol units and of poly(methyl methacrylate) of isotactic structure, (3) preparing a second solution in a polymerizable monomer having a vinylidene group, $CH_2=C<$, of a polyester having α,β-ethylenically unsaturated dicarboxylic acid units and dihydric alcohol units and of poly(methyl methacrylate) of syndiotactic structure, at least one of said solutions having dissolved therein a polymerization initiator, (4) mixing said first solution and said second solution, (5) impregnating said shaped mass with the resulting mixture, whereupon said mixture forms a gel, and (6) polymerizing said mixture.

4. A process for preparing fiber-reinforced plastic objects which comprises (1) forming a shaped mass of fibers, (2) preparing a first solution in polymerizable monomer having a monovinylidene group, $CH_2=C<$, of a polyester having α,β-ethylenically unsaturated dicarboxylic acid units and glycol units and of poly(methyl methacrylate) of isotactic structure, (3) preparing a second solution in polymerizable monomer having a monovinylidene group, $CH_2=C<$, of a polyester having α,β-ethylenically unsaturated dicarboxylic acid units and glycol units and of poly(methyl methacrylate) of syndiotactic structure, (4) incorporating in one solution a free radical polymerization initiator and in the other an activator, (5) mixing said first solution and said second, (6) impregnating said shaped mass with the resulting mixture, whereupon said mixture forms a gel, and (7) initiating polymerization of the mixture below the melting point of the gel.

5. A process for preparing fiber-reinforced plastic objects which comprises (1) forming a mass of fibers, (2) preparing a first solution in a monomer selected from at least one member of the class consisting of styrene and methyl methacrylate of a polyester having α,β-ethylenically unsaturated dicarboxylic acid units and glycol units and of poly(methylmethacrylate) of isotactic structure, (3) preparing a second solution in a monomer selected from at least one member of the class consisting of styrene and methyl methacrylate of (a) a polyester having α,β-ethylenically unsaturated dicarboxylic acid units and glycol units and (b) poly(methyl methacrylate) of syndiotactic structure, the amount of each type of poly(methyl methacrylate) being between 0.5% and 15% of the combined weights of the two said solutions, (4) incorporating in at least one solution a free radical polymerization intiator, (5) mixing said first solution and said second solution, (6) impregnating said mass of fibers with the mixture, and (7) initiating polymerization below about 60° C.

6. A process for preparing fiber-reinforced plastic objects which comprises (1) forming a shape of glass fibers, (2) preparing a first solution in styrene of a polyester having maleic acid units and glycol units and of poly(methyl methacrylate) of isotactic structure, (3) preparing a second solution in styrene of a polyester having maleic acid units and glycol units and of poly(methyl methacrylate) of syndiotactic structure, the amount of each type of poly(methyl methacrylate) being between 0.5% and 15% of the combined weights of the two said solutions, (4) incorporating in at least one solution a free radical polymerization initiator, (5) mixing said first and second solutions, (6) impregnating said shape with the mixture, and (7) initiating polymerization below about 60° C.

7. The process of claim 6, wherein in one solution the initiator incorporated is a peroxidic initiator and in the other there is incorporated an activator therefor.

References Cited in the file of this patent
UNITED STATES PATENTS

| | | |
|---|---|---|
| 2,340,109 | D'Alelio | Jan. 25, 1944 |
| 2,631,955 | Muskat | Mar. 17, 1953 |